United States Patent [19]

Hines

[11] Patent Number: 5,376,827
[45] Date of Patent: Dec. 27, 1994

[54] INTEGRATED TURBINE-GENERATOR

[75] Inventor: William R. Hines, Montgomery, Ohio

[73] Assignee: General Electric Company, Cincinnati, Ohio

[21] Appl. No.: 67,903

[22] Filed: May 27, 1993

[51] Int. Cl.$^5$ .................. F01D 15/10; F02C 6/00
[52] U.S. Cl. ...................... 290/52; 290/1 R; 310/67 R
[58] Field of Search ............. 290/40 R, 52, 1 R; 415/116; 310/67 R

[56] References Cited

U.S. PATENT DOCUMENTS

| | | | |
|---|---|---|---|
| 741,271 | 10/1903 | Porter et al. | 290/52 |
| 748,215 | 12/1903 | Porter et al. | 290/52 |
| 2,634,375 | 4/1953 | Guimbal | 290/52 |
| 2,988,325 | 6/1961 | Dawson | 415/116 |
| 3,955,359 | 5/1976 | Yannone et al. | 290/40 R |

Primary Examiner—Marc S. Hoff
Assistant Examiner—Robert Lloyd Hoover
Attorney, Agent, or Firm—Jerome C. Squillaro; David L. Narciso

[57] ABSTRACT

An integrated turbine and generator includes a power turbine having counter-rotating outer and inner rotor blades extending from respective outer and inner rotors. The outer and inner rotors are supported by stationary front and rear frames. At least one electrical generator includes a field core for creating magnetic poles which is disposed coaxially with an armature for generating electrical power upon relative rotation therebetween. The field core and the armature are disposed coaxially with the outer rotor and radially outwardly therefrom, with one of the field core or armature being fixedly joined to the outer rotor for rotation therewith, and the other one thereof being fixedly joined to the front and rear frames. In a preferred embodiment, a tractor piston is joined to the inner rotor and a pusher piston is joined to the outer rotor and both provided with steam under pressure for generating forward thrust forces therebetween for balancing aft thrust forces from the outer and inner blades carried through front and rear thrust bearings to the front and rear frames.

10 Claims, 4 Drawing Sheets

INTEGRATED TURBINE-GENERATOR

The present invention relates generally to gas turbine engines, and, more specifically, for gas turbine engines configured for marine and industrial hind-based gas turbine engines effective for driving electrical generators at synchronous speed for generating electrical power.

BACKGROUND OF THE INVENTION

Marine and industrial (M&I) gas turbine engines are either developed specifically for these applications or are derived from aircraft gas turbine engines. The engines typically include a core engine having a compressor, combustor, and high pressure turbine (HPT) driving the compressor for generating hot combustion gases which flow downstream to a free wheeling power turbine. The power turbine is joined to an electrical generator and is operated at a synchronous speed such as 3,000 rpm or 3,600 rpm for generating electrical power at 50 Hertz or 60 Hertz as desired.

Large industrial turbines are configured for generating electrical power in the range of about 100 megawatts (MW) to about 200 MW. Such high electrical power output may be obtained from a gas turbine by injecting steam into the free wheeling power turbine as is conventionally known for increasing the specific horsepower thereof by a factor of about 5 for example. In this way, the overall size and therefore complexity and cost of the turbine may be contained while still producing a substantial increase in horsepower for driving larger generators than would otherwise be possible. However, one significant problem in generating the high specific horsepower from the free wheeling power turbine is an attendant increase in rotor thrust loads or forces which must be accommodated by thrust bearings. State of the art thrust bearings for an output shaft of about 40 cm outer diameter for a 3,600 rpm synchronous speed are limited to about 41,000 kg thrust loads. Conventional thrust bearings such as the Kingsbury type sized for these larger thrust loads require a substantial mount of oil flow which oil flow experiences heating due to friction losses therein and result in a more complex and costly system. However, the thrust loads for a 200 MW power turbine are projected to be substantially greater and on the order of about twice the present design limit capabilities of conventional thrust bearings, for example over 100,000 kg.

Another significant problem in large steam-injected power turbines operating at 3,600 rpm is the substantial centrifugal stresses generated in the power turbine rotor blades since such blades are relatively long for extracting the required power from the combustion gases flowing therebetween. Conventional stationary stator vanes in the power turbine may typically require cooling whereas the rotor blades may be typically uncooled, with cooling sir being bled from the compressor of the core engine for example which not only decreases overall operating efficiency of the engine, but the spent cooling air from the vanes dilutes the combustion gases in the power turbine which decreases their efficiency of boiling water in a cooperating boiler disposed downstream from the power turbine.

In view of these exemplary considerations in using a gas turbine engine for powering an electrical generator for producing relatively large output electrical power, the design thereof becomes relatively complex and therefore costly.

SUMMARY OF THE INVENTION

An integrated turbine and generator includes a power turbine having counter-rotating outer and inner rotor blades extending from respective outer and inner rotors. The outer and inner rotors are supported by stationary front and rear frames. At least one electrical generator includes a field core for creating magnetic poles which is disposed coaxially with an armature for generating electrical power upon relative rotation therebetween. The field core and the armature are disposed coaxially with the outer rotor and radially outwardly therefrom, with one of the field core and armature being fixedly joined to the outer rotor for rotation therewith, and the other one thereof being fixedly joined to the front and rear frames. In a preferred embodiment, a tractor piston is joined to the inner rotor and a pusher piston is joined to the outer rotor and both provided with steam under pressure for generating forward thrust forces thereagainst for balancing aft thrust forces from the outer and inner blades carried through front and rear thrust bearings to the front and rear frames.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
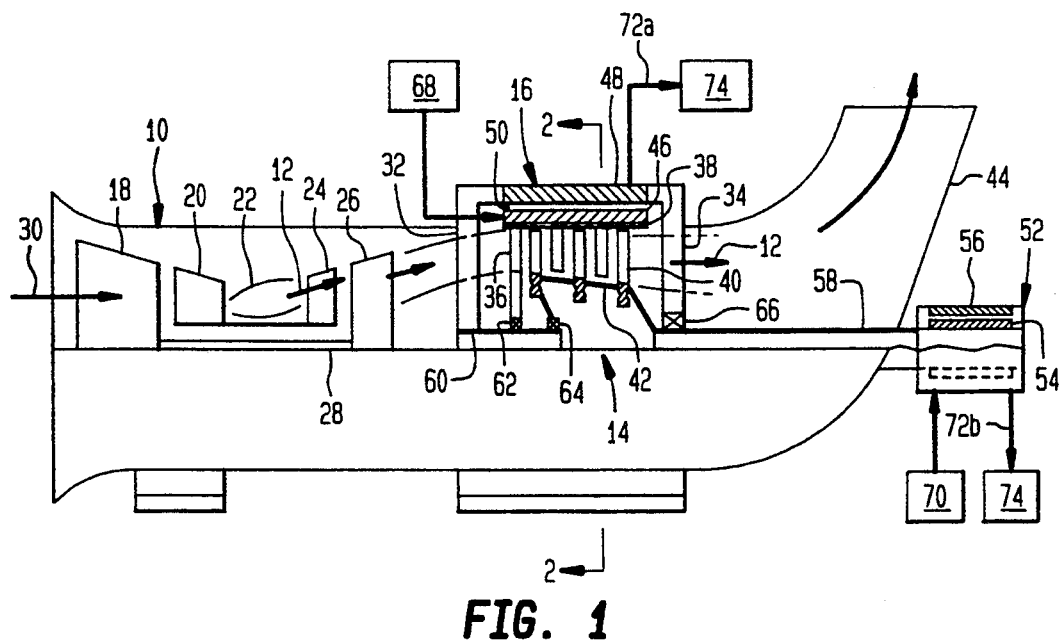
FIG. 1 is a schematic, elevational, partly sectional view of an exemplary integrated turbine and generator in accordance with one embodiment of the present invention.

Illustrated schematically in FIG. 1 is an exemplary, conventional core engine 10 effective for producing combustion gases 12 for flow to an integrated power turbine 14 and first electrical generator 16 for producing electrical power. The core engine 10 is a conventional dual rotor gas turbine engine having a low pressure compressor CLPC) 18, high pressure compressor (HPC) 20, combustor 22, high pressure turbine (HPT) 24, and low pressure turbine (L.,PT) 26 all disposed coaxially about a longitudinal or axial centerline axis 28. In conventional operation, air 30 is drawn in by the LPC 18 and compressed and further compressed in the HPC 20 and discharged into the combustor 22 wherein it is mixed with fuel and ignited for generating the combustion gases 12 which flow downstream through the HPT 24 and LPT 26 which extract energy therefrom for powering the compressors joined thereto and for discharging the hot combustion gases 12 downstream into the power turbine 14. The combustion gases 12 provided to the power turbine 14 may be generated by any other type of gas turbine engine or from any other suitable source as desired.

The power turbine 14 includes a stationary front frame 32 spaced axially from a stationary rear frame 34, both of which conventionally include a plurality of circumferentially spaced apart radially extending struts which allow the combustion gases 12 to flow axially therebetween. The rear frame 34 is configured to suitably deswirl flow exiting the LPT 26. The power turbine 14 further includes a plurality of stages or rows of first or outer rotor blades 36 extending radially inwardly from an annular outer rotor 38. A plurality of stages or rows of second or inner rotor blades 40 extend radially outwardly from an annular second or inner rotor 42. The outer blades 36 are interdigitated with the inner blades 40 and disposed between respective stages of the inner blades 40 as is conventionally known for providing a counter-rotating power turbine 14. As shown in the exemplary embodiment illustrated in FIG. 1, three stages of the outer blades 36 cooperate with three stages of the inner blades 40 and are all disposed axially between the front and rear frames 32 and 34 and conventionally configured for rotating the outer and inner rotors 38 and 42 in opposite directions designated $R_1$ and $R_2$ as illustrated in more particularity in FIG. 2. Returning again to FIG. 1, a conventional exhaust nozzle 44 extends downstream from the power turbine 14 for discharging the combustion gases 12 therefrom.

Figure 2:
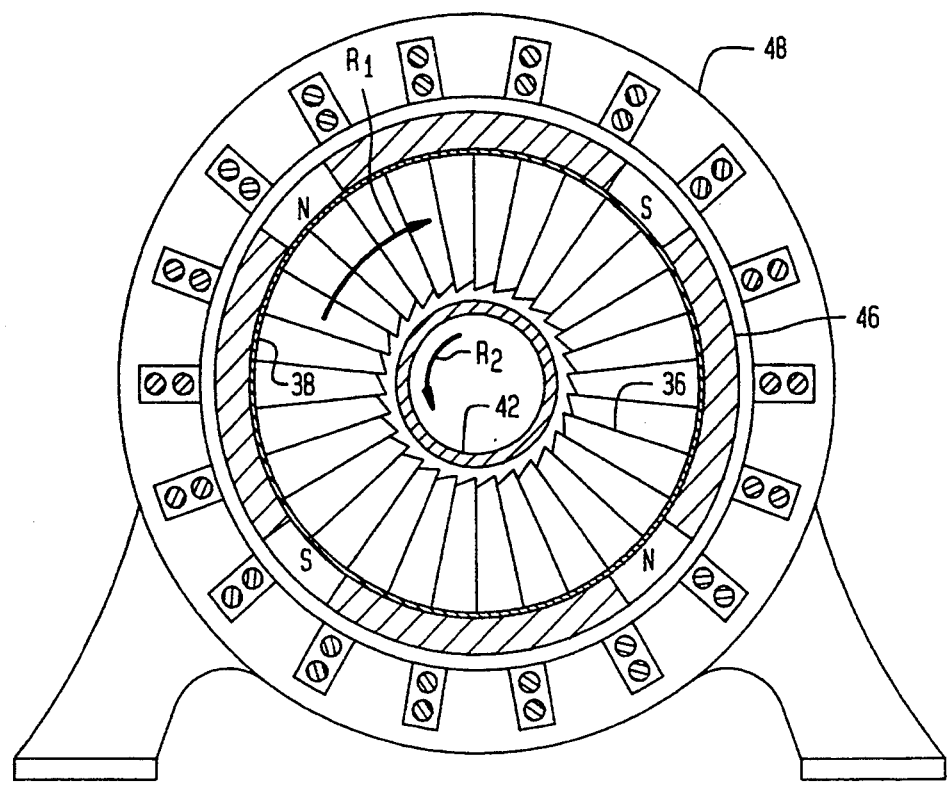
FIG. 2 is a transverse sectional view through the power turbine and integrated generator illustrated in FIG. 1 and taken along line 2-2.

In accordance with one embodiment of the present invention as illustrated in FIGS. 1 and 2, at least one electrical generator, i.e., the first generator 16, is integrated with the power turbine 14 for eliminating a respective output shaft and reducing the overall complexity thereof. The first generator 16 includes a conventional annular first field core 46 having suitable copper windings conventionally configured for creating a plurality of magnetic poles and is disposed coaxially with a conventional annular first armature 48 for generating electrical current or power upon relative rotation therebetween. The first field core 46 and the first armature 48 are disposed coaxially with the outer rotor 38 and radially outwardly therefrom about the centerline axis 28, with one of the first field core 46 and the first armature 48 being fixedly joined to the outer rotor 38 for rotation therewith, with the other one of the first field core 46 and the first armature 48 being fixedly joined to the stationary front and rear frames 32 and 34. In a conventional generator, either the first field core 46 may be stationary or rotating with the first armature 48 being rotating or stationary, respectively, for electromagnetically generating current in the first armature 48. In the exemplary embodiment illustrated in FIGS. 1 and 2, the first field core 46 is conventionally fixedly joined to and surrounds the outer rotor 38, and the first armature 48 is fixedly joined to the front and rear frames 32, 34 and is spaced radially outwardly from time first field core 46 to define an empty annulus 50 therebetween, with electrical power being generated in the first armature 48 upon rotation of the outer rotor 38 and the first field core 46 joined thereto. The first field core 46 includes conventional copper windings specifically configured for generating four poles in this exemplary embodiment as indicated by the north (N) and south (S) magnetic poles shown schematically in FIG. 2, and the first armature 48 conventionally includes a plurality of iron core laminations and copper windings therein in which the electrical power is produced upon rotation of the first field core 46 therein.

Also in the embodiment illustrated in FIG. 1, a conventional second electrical generator 52 includes a conventional second field core 54 for creating a plurality of magnetic poles and is disposed coaxially with a conventional second armature 56 for generating electrical current or power upon relative rotation therebetween. The second generator 52 is operatively joined to the inner rotor 42 through an integral output shaft 58 for receiving shaft power therefrom for driving the second generator 52 to produce electrical power.

Disposed at a radially inner end of the front frame 32 is a cylindrical, stationary, front support shaft 60 extending axially aft therefrom for supporting at a forward end thereof a conventional front thrust bearing 62 and a conventional roller beating (not shown) to support the outer rotor 38 and first field core 46, and at an aft end thereof a roller bearing 64 for supporting the forward end of the inner rotor 42. The radially inner end of the rear frame 34 includes a conventional rear thrust bearing 66 and a conventional roller beating (not shown) in which is supported the output shaft 58. The thrust bearings 62, 66 are shown as conventional tapered roller bearings (see FIG. 4), but may be any other conventional type such as Kingsbury (not shown).

Referring again to FIG. 1, conventional first field means 68 are operatively joined to the first field core 44S by suitable slip rings for example for providing electrical current to the first field core 46 to form the magnetic poles therein. The first field means 68 are conventionally effective for varying electromagnetic field strength of the poles for controlling speed of the outer rotor 38 by varying load on the first field core 46 attached thereto. Similarly, conventional second field means 70 are operatively joined to the second field core 54 for providing electrical current thereto to form suitable magnetic poles therein, with the second field means 70 also being effective for varying the electromagnetic field strength of the poles therein for controlling speed of the inner rotor 42 by varying the load on the second field core 54 and the output shaft 58. Since both outer and inner rotors 38, 42 are free wheeling rotors, the loads provided by the first and second field cores 44S, 54 may be used to advantage for controlling the speed thereof for maintaining a synchronous speed. For example, in the preferred embodiment of the present invention, the outer and inner rotors 38, 42 are operated at 1,800 rpm and each of the first and second generators 16, 52 is a four-pole generator effective for generating alternating current power at 60 Hertz. Electrical power from the respective first and second armatures 48, 56 is carried by respective electrical output lines 72a, 72b to power an electrical utility grid 74 for example.

In the embodiment of the invention illustrated in FIG. 1, one output shaft has been eliminated by integrating the first generator 16 directly with the outer rotor 38 of the power turbine 14. To further integrate the system, the output shaft 58 may be eliminated, and the second generator 52 also may be integrated with the power turbine 14 as illustrated in the exemplary embodiment illustrated in FIG. 3. In this embodiment, the second generator is designated 52A, and the second field core is designated 54A and surrounds the outer rotor 38, but is fixedly joined to the inner rotor 42 through the radially outer ends of the last stage of the inner blades 40 for example. The second armature is designated 56A and is fixedly joined to the first armature 48 coaxially therewith and to the rear frame 34, and is also spaced radially outwardly from the second field core 54A for generating electrical power upon rotation of the inner rotor 42 and the second field core 54A joined thereto. In this embodiment, the power turbine 14 is fully integrated with both the first generator 16 and the second generator 52A, with the respective first and second field cores 445, 54A being fixedly joined to the respective outer and inner rotors 38, 42 for respective counter-rotation therewith. The first and second field cores 46, 54A are preferably configured for generating the four magnetic poles upon being powered from the first and second field means 68, 70 so that 60 Hertz electrical power is provided through the output lines 72a, 72b from the respective first and second armatures 48, 56A when the outer and inner rotors 38, 42 operate at a synchronous speed of 1,800 rpm.

Figure 3:
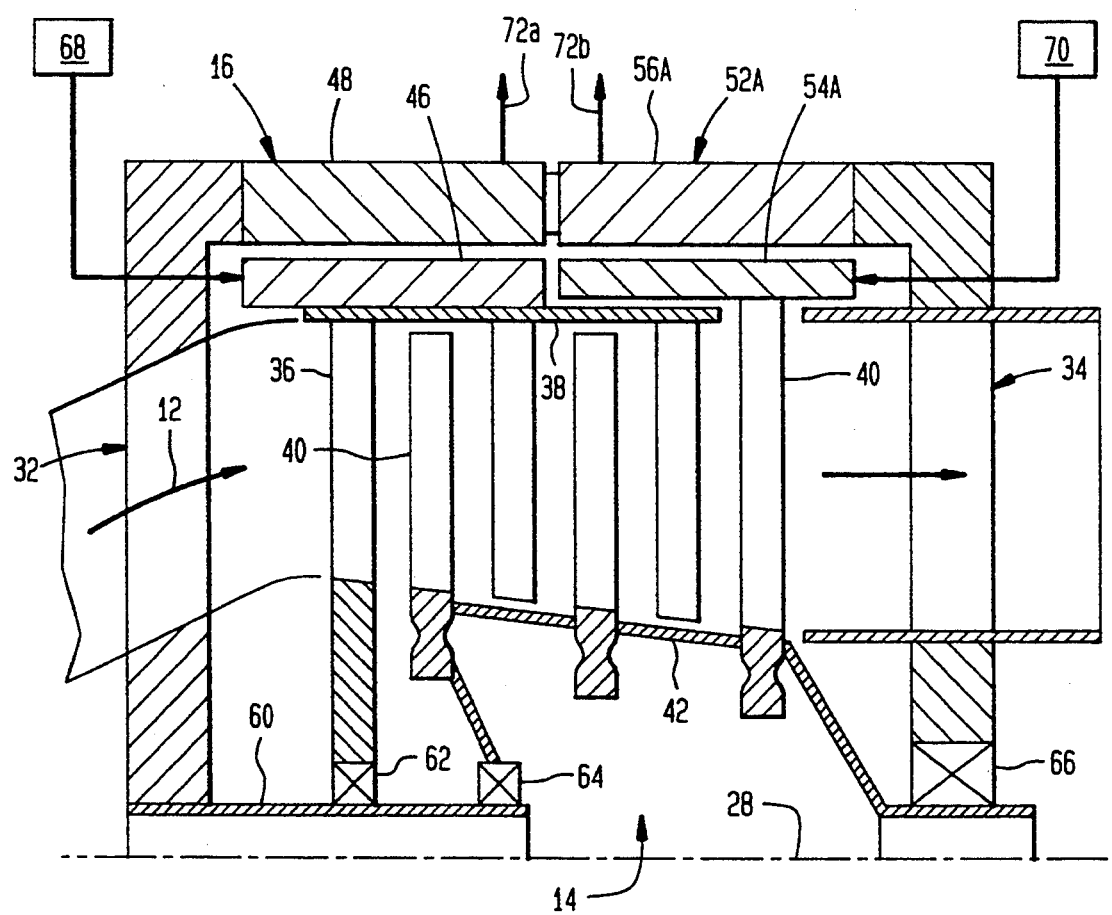
FIG. 3 is a schematic, partly sectional view of an upper portion of an integrated turbine and generator in accordance with a second embodiment of the present invention.

In both embodiments illustrated in FIGS. 1 and 3, complexity of the overall system is reduced by integrating one or both of the generators with the power turbine 14. And, operation of the power turbine 14 at 1,800 rpm with the four pole generators provides conventional 60 Hertz output power with reduced stress in the outer and inner rotor blades 36, 40 which are subjected to substantially less centrifugal loads as compared to conventional operation at 3,600 rpm.

Figure 4:
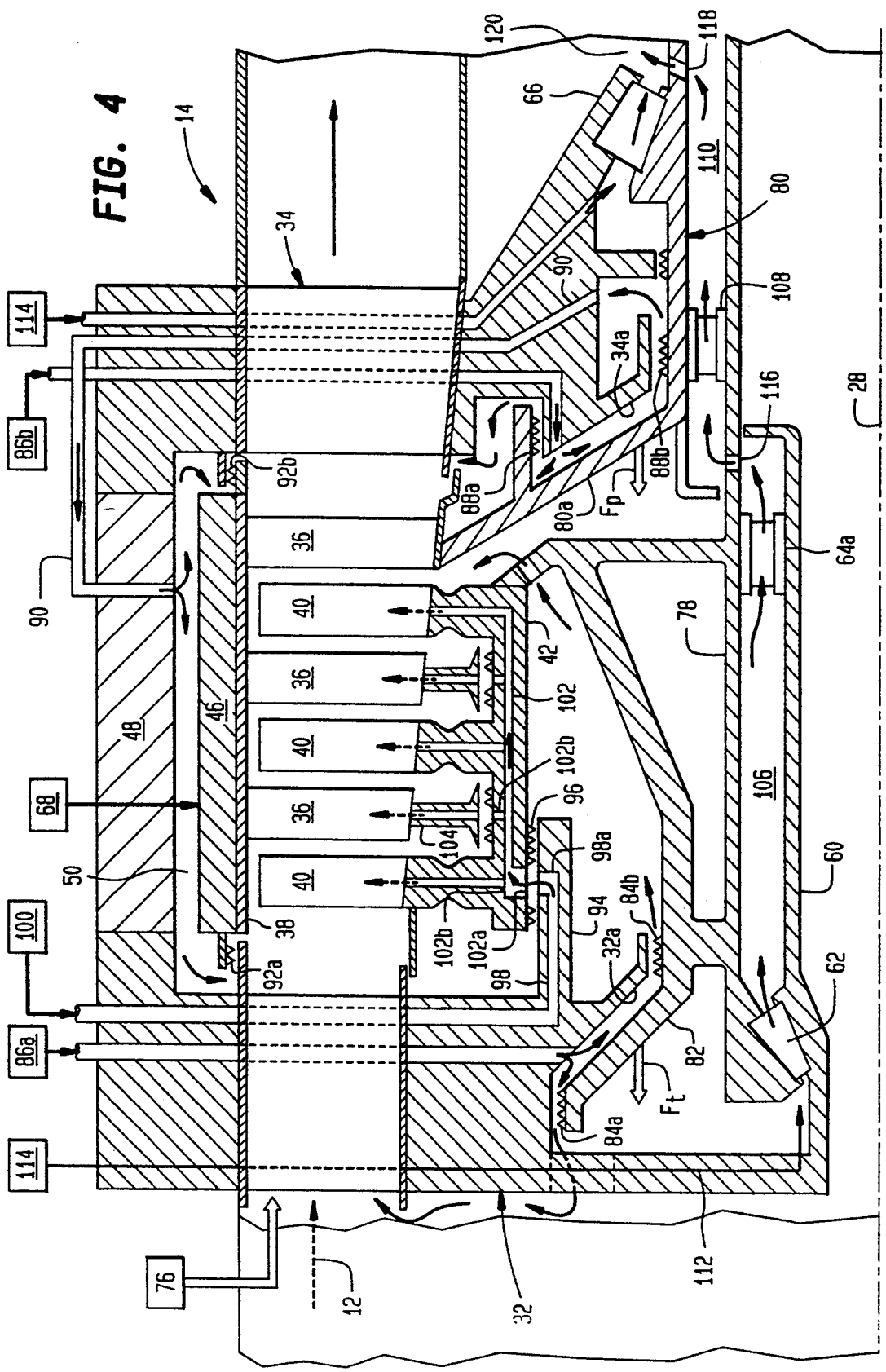
FIG. 4 is a schematic, partly sectional view of an upper portion of an integrated turbine and generator in accordance with another embodiment of the present invention.

Illustrated in FIG. 4 is another embodiment of the integrated turbine-generator shown in FIG. 1 which additionally includes conventional means 76 for selectively injecting steam into the power turbine 14 when desired for increasing specific horsepower therefrom in a conventionally known manner. However, when the power turbine 14 is operated with steam injection, the thrust forces generated by the turbine blades 36 and 40 increase which are carried through the respective rotors 38.42 to the respective front and rear thrust bearings 62, 66. Since the power turbine 14 is a counter-rotating turbine, the total thrust force from the blades may be divided into two loadpaths to the respective thrust bearings 62, 66 in a fixed division thereof either equal or unequal as desired which is an improvement over a conventional single rotor power turbine.

In the embodiment illustrated in FIG. 4, the first stage of the power turbine 14 is the first row of the inner blades 40 followed in turn by the first row of the outer blades 36, with the last stage of the power turbine 14 being the last row of the outer blades 36. In the exemplary embodiment illustrated in FIG. 4, a hollow cylindrical mid-shaft 78 is disposed coaxially with the inner rotor 42 and is conventionally fixedly joined thereto at the last stage of blades 40, with the outer race of the front thrust bearing 62 being supported on the inner diameter of the forward end thereof, with the roller bearing designated 64a being a first differential bearing with its outer race being supported on the inner diameter of an intermediate portion of the mid-shaft 78 and its inner race being supported on the outer diameter of the aft end of the front support shaft 60.

The outer rotor 38 in the exemplary embodiment illustrated in FIG. 4 is supported through the last stage of outer blades 36 by a rear support shaft 80 extending radially inwardly from the inner diameter of the last stage of outer blades 36, with the rear support shaft 80 including a cylindrical distal or aft end disposed coaxially around the mid-shaft 78 and spaced radially inwardly from the rear frame 34 for supporting the aft thrust bearing 66 therebetween with its outer race conventionally joined to the rear frame 34 and its inner race conventionally joined to the rear support shaft 80. In this way, direct loadpaths are provided from the respective rotors 38, 42 to the respective rear and forward thrust bearings 66, 62.

During steam injection of the power turbine 14, the aft thrust forces are increased substantially and in order to reduce or balance the reaction forces through the front and rear thrust bearings 62, 66, a conventional conical tractor piston 82 is fixedly joined to the inner rotor 42, and the rear support shaft 80 includes integrally therewith at an intermediate portion thereof a similar conical portion configured as a pusher piston 80a. During engine start-up, cooling air may be used to cool the steam pistons and their seals until the boilers are up and generating pressurizing steam. The tractor piston 82 is spaced axially forward from a portion of the front frame 32 in the form of a front reaction cone 32a to define a pressure chamber therebetween having radially outer and inner labyrinth seals 84a and 84b for sealing the pressure chamber between the rotary tractor piston 82 and the stationary reaction cone 32a. The front thrust bearing 62 is disposed between the inner rotor 42 and the front frame 32 for carrying thereto the aft thrust force from the inner blades 40 on the inner rotor 42. The tractor piston 82 is joined to the inner rotor 42 for creating a traction force $F_t$ in the axial forward direction to pull the inner rotor 42 forwardly against the aft directed thrust forces generated by the combustion gases 12 and injected steam channeled through the power turbine 14 during operation. Conventional means 86a are provided for selectively injecting a pressurized fluid such as steam or air radially inwardly through the front frame 32 to the pressure chamber defined between the tractor piston 82 and its reaction cone 32a which acts against the aft facing side of the tractor piston 82 for generating thereagainst a forward thrust force, i.e. $F_t$. for balancing or reducing thereagainst force from the inner blades 40 carried through the front thrust bearing 62.

Similarly, the rear thrust bearing 66 is disposed between the rear support shaft 80 and the rear frame 34 for carrying thereto aft thrust force from the outer blades 36 on the outer rotor 38. The pusher piston 80a is spaced axially forward of a complementary portion of the rear frame 34 in the form of a rear reaction cone 34a to define with the pusher piston 80a a pressure chamber therebetween which is sealed at its outer and inner ends by conventional outer and inner labyrinth seals 88a and 88b. Additional conventional means 86b are also provided for selectively injecting the pressurized fluid such as steam or air radially inwardly through the rear frame 34 to the pressure chamber defined between the pusher piston 80a and its reaction cone 34a for creating a forwardly directed axial pusher force $F_p$ against the aft facing side of the pusher piston 80a which is a forward thrust force for balancing or reducing the aft thrust force from the outer blades 36 carried through the rear thrust bearing 66. The tractor and pusher forces $F_t$ and $F_p$ may be controlled by conventionally sensing steam pressure within the pistons and modulating steam flow thereto as desired.

In this way, the counter-rotating rotors 38, 42 allow the use of the two thrust bearings 62, 66 for dividing the total aft thrust generated in the power turbine 14 to two locations in a fixed relationship as desired. And, the two balance pistons 82, 80a may be separately operated for generating the traction and pusher forces $F_t$ and $F_p$ for reducing the thrust forces which would otherwise be carried by the thrust bearings 62, 66 during steam injection of the power turbine 14. This reduces the required size of the thrust bearings 62, 66 and also reduces the required oil flow therefor.

In the preferred embodiment illustrated in FIG. 4, the front outer seal 84a is conventionally configured with a larger gap for providing more leakage therethrough than the inner front seal 84b so that the spent steam leaking from the tractor piston 82 may be allowed to flow through a suitable flow channel in the front frame 32 and into the main flowpath of the combustion gases 12 for passage through all the blades 36,443. This allows recoupment of the energy of the spent steam, which spent steam also includes additional friction energy obtained in the pressure chamber between the rotating tractor piston 82 and the stationary reaction cone 32a.

In accordance with another feature of the present invention, additional means in the exemplary form of a return conduit 90 are provided for channeling spent steam from the pusher piston 80a radially outwardly through the rear frame 34 to the annulus 50 radially between the first field core 46 and the first armature 48 for pressurizing the annulus 50. In this embodiment, the inner rear seal 88b is conventionally configured with a larger gap for leaking more steam than the outer rear seal 88a to ensure primary flow of the spent steam from the pusher piston 80a through the return conduit 90 to the annulus 50. Since the outer rotor 38 is a rotating component it includes forward and aft labyrinthtype seals 92a and 92b which cooperate with complementary stationary extensions of the forward mad aft frames 32, 34. The seals 92a, 92b are required to prevent escape of the hot combustion gases 12 from the main flowpath with leaking thereof decreasing overall efficiency of the power turbine 14 as well as undesirably heating the stationary components thereof. By pressurizing the annulus 50 with the spent steam from the aft pusher piston 80a, the seals 92a, 92b are also pressurized for preventing escape of the combustion gases 12 therethrough while allowing the spent steam to be discharged through the seals 92a, 92b for return into the combustion gas main flowpath. The energy of the spent steam returned through the forward seal 92a may then be recouped as it passes through the several blades 36, 40.

The rotor blades of many conventional power turbines are typically uncooled whereas the stationary interstage vanes are typically cooled. Since stationary vanes typically require more cooling than rotor blades, the counter-rotating power turbine 14 in the present invention eliminates the stationary vanes and therefore the need for the cooling thereof for increasing the overall efficiency of operation. One or more of the stages of the rotor blades 36, 40 may be cooled as desired in accordance with additional features of the present invention. More specifically, an annular stationary seal land 94 preferably extends axially rearwardly from the front frame 32 and is spaced radially inwardly of a forward end of the inner rotor 42 which has a plurality of conventional labyrinth seal teeth 96 extending radially inwardly adjacent to the seal land 94 for providing a rotary seal therewith. At least one cooling air supply conduit 98 extends radially through the front frame 32 and axially in the seal land 94 for channeling cooling air from conventional means 100 for supplying cooling air, such as air bled from a compressor of the core engine 10. The supply conduit 98 includes an outlet 98a facing radially outwardly toward the seal teeth 96 at an axial intermediate position therebetween. At least one distribution conduit 102 is disposed in the inner rotor 42 and includes an inlet 102a facing radially inwardly toward the supply conduit outlet 98a in axial alignment therewith for receiving therefrom radially across or through the seal teeth 96 the cooling air. The distribution conduit 102 includes at least one outlet 102b disposed in flow communication with at least one stage of the outer and inner blades 36, 40 for channeling the cooling air thereto for cooling thereof in a conventionally known manner.

As shown in FIG. 4, at least one stage of the outer blades 36 includes a plurality of inlet nozzles 104 extending radially inwardly from respective ones of the outer blades 36 adjacent to the inner rotor 42 for receiving from the distribution conduit outlet 102b the cooling air. Additional labyrinth seal teeth are provided on the outer diameter of the inner rotor 42 adjacent to the inlet nozzles 104, with the cooling air from the distribution conduit outlet 102b being channeled radially between adjacent ones of the labyrinth teeth into the inlet nozzles 104.

Figure 5:
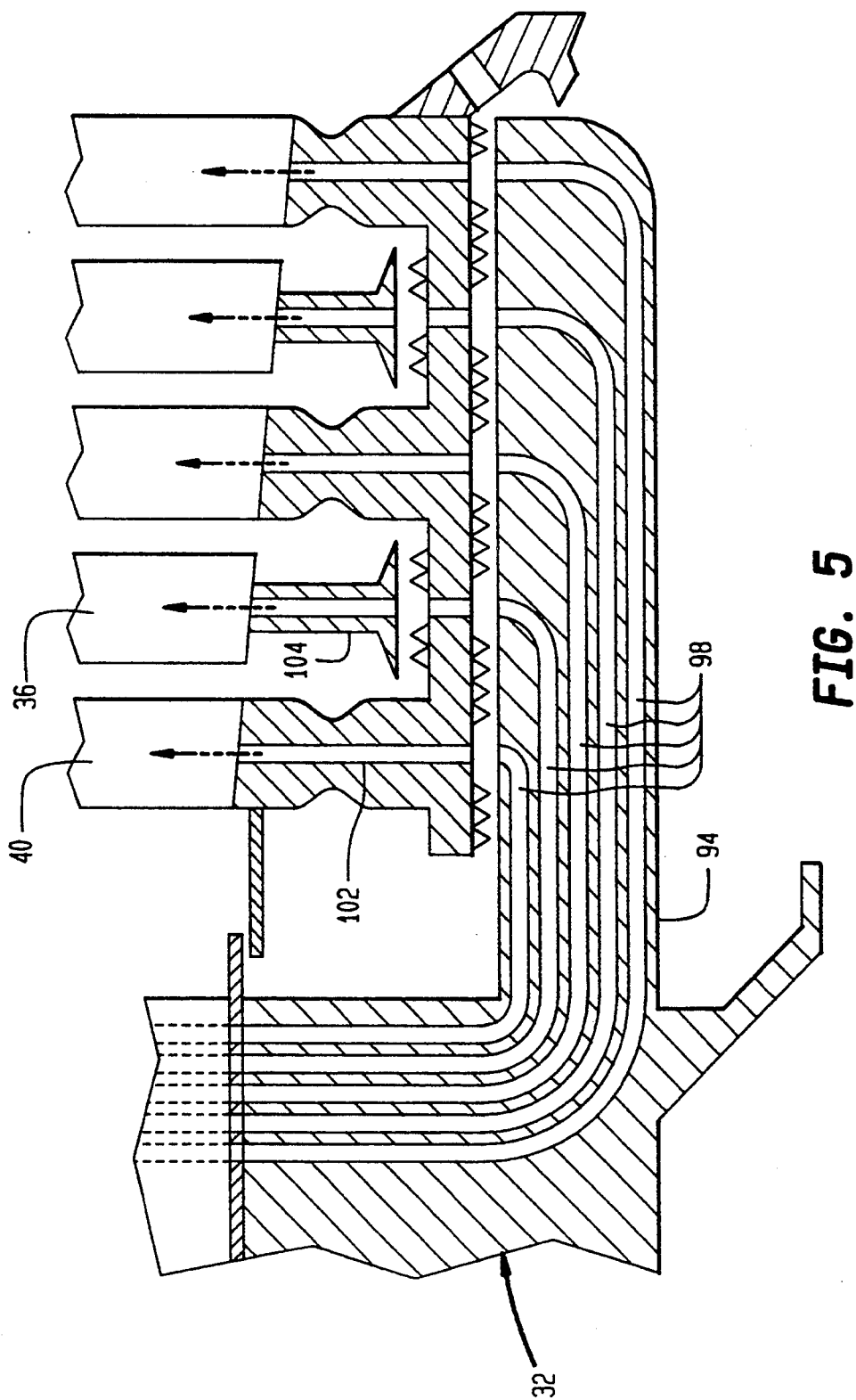
FIG. 5 is a schematic, sectional view of a cooling air supply in accordance with another embodiment of the present invention.

Although a single supply conduit 98 and single distribution conduit 102 are illustrated in FIG. 4 for simplicity in channeling cooling air to each of the three stages of inner blades 40 and the forward two stages of outer blades 36, independent and separate supply and distribution conduits 98, 102 may be provided for each stage as desired, and as shown in FIG. 5. Furthermore, respective pluralities of circumferentially spaced apart J-shaped scoops may be used between the distribution conduit inlet 102a and the stationary seal land 94 for directing the cooling air into the distribution conduit 102, with similar J-shaped scoops also being provided as desired from the inlet nozzles 104 for collecting the cooling air from the distribution conduit outlets 102b.

As illustrated in FIG. 4, the mid-shaft 78 is hollow and is fixedly joined to beth the inner rotor 42 and the tractor piston 82 for support thereof, and is spaced radially outwardly from the front support shaft 60 to define therebetween a first annular oil conduit 106. The outer race of the front thrust bearing 62 is supported on the forward end of the mid-shaft 78, the outer race of the first differential bearing 64a is supported on the intermediate portion of the mid-shaft 78, and the inner race of a conventional second differential bearing 108 is supported on the outer diameter of the aft end of the mid-shaft 78.

The distal end of the rear support shaft 80 is spaced radially outwardly from the mid-shaft 78 for defining therebetween an annular second oil conduit 110, with the outer race of the second differential bearing 108 being supported on the inner diameter of the shaft 80. Conventional means in the form of an oil supply conduit 112 are provided for channeling pressurized oil from a conventional oil supply 114 radially inwardly through the front frame 32 to the front thrust bearing 62 for flow therethrough and in turn through the first oil conduit 106 to the first differential bearing 64a and therethrough, and then through a plurality of mid-shaft radial holes 116 through the mid-shaft 78 for flow by centrifugal force to the second oil conduit 110 and the second differential bearing 108. The oil then flows through the bearing 108 and holes 118 through the rear support shaft 80 aft of the rear thrust bearing 66 to a conventional oil sump 120.

The improved power turbine 14 integrated with one or more of the generators 16, 52, 52A provides significant advantages for generating electrical power especially for large power applications in the 100-200 MW range. Counter-rotation also allows the use of two smaller electrical generators instead of one larger electrical generator. And, by integrating one or both of the electrical generators to the outer and inner rotors 38, 42, a more compact arrangement is provided which eliminates the otherwise required output shafts and the costs associated therewith.

By utilizing the counter-rotating power turbine 14, the respective rotational speeds of the outer and inner rotors 38, 42 may be reduced in half from 3,600 rpm to 1,800 rpm for example for generating electrical power at 60 Hertz using four pole electrical generators. Correspondingly, blade stress is substantially reduced, and overall cooling flow requirements are also reduced because of reduced blading stresses and by the elimination of stationary cooled stator vanes. By eliminating the vanes, manufacturing costs will be reduced, aerodynamic efficiency will be increased, spent vane cooling air will no longer dilute combustion gases entering conventional recuperators or boilers, less cooling air is required since all the blades are now rotating, and, repair costs are also reduced. The lower operating speed not only reduces blade stress but also reduces bearing losses due to friction and heat dissipation in the cooling oil therefor. The counter-rotation design of the power turbine 14 improves aerodynamic efficiency and allows the substantial rotor thrust generated by the blades therein to be divided between the forward and aft thrust bearing 62, 66 in predetermined relationship as desired. The tractor and pusher balance pistons 82, 80a may then be provided for reducing the thrust forces carried by the forward and rear thrust bearings 62, 66 during steam injection operation of the power turbine 14 increasing specific horsepower thereof. The spent steam from the pistons which is heated by friction may then be returned to the main combustion gas flowpath wherein energy therefrom may be recouped from flow through the turbine blades.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claim:

1. An integrated turbine-generator comprising: a power turbine for receiving combustion gases including:
   a front frame spaced axially from a rear frame;
   a plurality of stages of outer rotor blades extending radially inwardly from an annular outer rotor; and
   a plurality of stages of inner rotor blades extending radially outwardly from an annular inner rotor, said outer blades being interdigitated with said inner blades and disposed axially between said front and rear frames, and configured for rotating said outer and inner rotors in opposite directions; and
   at least a first electrical generator including a first field core for creating a plurality of magnetic poles disposed coaxially with a first armature for generating electrical power upon rotation therebetween, said first field core and said first armature being spaced radially apart to define an empty annulus therebetween and disposed coaxially with said outer rotor and radially outwardly therefrom, with one of said first field core and said first armature being fixedly joined to said outer rotor for rotation therewith, and the other of said first field core and said first armature being fixedly joined to said front and rear frames.

2. A turbine-generator according to claim 1 further comprising a second generator including a second field core disposed coaxially with a second armature for generating electrical power upon relative rotation therebetween, said second generator being operatively joined to said inner rotor for receiving shaft power therefrom for driving said second generator.

3. A turbine-generator according to claim 2 wherein said second field core surrounds said outer rotor and is fixedly joined to said inner rotor, and said second armature is fixedly joined to said first armature and said rear frame and is spaced radially outwardly from said second field core for generating electrical power upon rotation of said inner rotor and said second field core.

4. A turbine-generator according to claim 1 wherein said first field core is fixedly joined to and surrounds said outer rotor, and said first armature is fixedly joined to said front and rear frames and is spaced radially outwardly from said first field core for generating electrical power upon rotation of said outer rotor and said first field core.

5. A turbine-generator according to claim 4 further comprising first field means for providing electrical current to said first field core to form said magnetic poles therein, said first field means being effective for varying electromagnetic field strength of raid poles for controlling speed of said outer rotor.

6. A turbine-generator according to claim 4 further comprising:
   a front thrust beating disposed between said inner rotor and said front frame for carrying thereto aft thrust force from said inner blades on said inner rotor;
   a conical tractor piston fixedly joined to said inner rotor;
   a rear support shaft extending radially inwardly from one stage of said outer blades;
   a rear thrust bearing disposed between said rear support shaft and said rear frame for carrying thereto aft thrust force from said outer blades on said outer rotor;
   said rear support shaft including a conical portion configured as a pusher piston; and
   means for selectively injecting pressurized fluid against aft facing sides of both said tractor and pusher pistons for generating thereagainst forward thrust forces for balancing said aft thrust forces from said outer and inner blades carried through said front and rear thrust bearings.

7. A turbine-generator according to claim 6 further comprising means for channeling spent fluid from said pusher piston radially outwardly through said rear frame to said annulus radially between said first field core and said first armature for pressurizing said annulus.

8. A turbine-generator according to claim 4 further comprising:

an annular seal land extending axially rearwardly from said front frame and spaced radially inwardly of a forward end of said inner rotor, said inner rotor forward end having a plurality of labyrinth seal teeth extending radially inwardly adjacent to said seal land for providing a seal therewith;

at least one supply conduit extending radially through said front frame and axially in said seal land for channeling cooling air, said supply conduit having an outlet facing radially outwardly toward said seal teeth;

a distribution conduit disposed in said inner rotor, and having an inlet facing radially inwardly toward said supply conduit outlet for receiving therefrom radially through said seal teeth said cooling air, and further having an outlet disposed in flow communication with at least one stage of said outer and inner blades for channeling said cooling air thereto for cooling thereof.

9. A turbine-generator according to claim 8 wherein at least one stage of said outer blades includes a plurality of inlet nozzles extending radially inwardly from respective ones of said outer blades adjacent to said inner rotor for receiving from said distribution conduit outlet said cooling air.

10. A turbine-generator according to claim 4 further comprising:

a front support shaft extending axially aft from said front frame and supporting at a forward end thereof said front thrust bearing, and at an aft end thereof a first differential bearing;

a hollow mid-shaft fixedly joined to said inner rotor and said tractor piston for support thereof, and spaced radially outwardly from said front support shaft to define a first annular oil conduit therebetween, said front thrust bearing being supported on a forward end of said mid-shaft, said first differential bearing being supported on an intermediate portion of said mid-shaft, and a second differential bearing being supported on an at end of said mid-shaft;

said rear support shaft further including a distal end spaced radially outwardly from said mid-shaft for defining an annular second oil conduit therebetween and for supporting said second differential bearing radially therebetween, and spaced radially inwardly from said rear frame for supporting said rear thrust bearing therebetween; and means for channeling oil through said front frame to said front thrust bearing for flow therethrough and in turn through said first oil conduit to said first differential bearing, and through a plurality of radial holes through said mid-shaft to said second oil conduit and said second differential bearing.

* * * * *

UNITED STATES PATENT AND TRADEMARK OFFICE
CERTIFICATE OF CORRECTION

PATENT NO. : 5,376,827

DATED : December 27, 1994

INVENTOR(S) : WILLIAM R. HINES

It is certified that error appears in the above-indentified patent and that said Letters Patent is hereby corrected as shown below:

Col. 1, line 6, after "industrial", delete "hind-based" and insert therefor --land-based--; and
    line 59, after "cooling", delete "sir" and insert therefor --air--.

Col. 2, line 59, delete "CLPC)" and insert therefor --(LPC); and
    line 61, delete "(I.,PT)" and insert therefor --(LPT).

Col. 3, line 60, after "from", delete "time" and insert therefor --the--.

Col. 4, line 19 and 24, after "roller" delete "beating" and insert therefor --bearing--;
    line 31, delete "445" and insert therefor --46--; and
    line 46, delete "445" and insert therefor --46--.

Col. 5, line 10, delete "445" and insert therefor --46--; and
    line 38, delete "38.42" and insert therefor --38,42--.

Col. 6, line 40, delete "thereagainst" and insert therefor --the aft thrust--.

UNITED STATES PATENT AND TRADEMARK OFFICE
CERTIFICATE OF CORRECTION

PATENT NO. : 5,376,827
DATED : December 27, 1994
INVENTOR(S) : WILLIAM R. HINES

It is certified that error appears in the above-indentified patent and that said Letters Patent is hereby corrected as shown below:

Col. 7, line 14, delete "443" and insert therefor --40--; and
line 31, delete "labyrinthtype" and insert therefor --labyrinth-type--.

Col. 9, line 7, delete "beth" and insert therefor --both--.

Col. 10, Cl. 5, line 37, delete "raid" and insert therefor --said--; and
Cl. 6, line 41, delete "beating" and insert therefor --bearing--.

Signed and Sealed this

Fifth Day of September, 1995

Attest:

BRUCE LEHMAN

Attesting Officer

Commissioner of Patents and Trademarks